(12) United States Patent
Hotta et al.

(10) Patent No.: US 6,776,823 B2
(45) Date of Patent: Aug. 17, 2004

(54) GAS/LIQUID SEPARATING DEVICES

(75) Inventors: Akihisa Hotta, Aichi-ken (JP); Koichi Suda, Aichi-ken (JP); Kiyoshi Yoshizumi, Aichi-ken (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/359,299

(22) Filed: Feb. 6, 2003

(65) Prior Publication Data

US 2003/0150330 A1 Aug. 14, 2003

(30) Foreign Application Priority Data

Feb. 8, 2002 (JP) ........................................ 2002-032816

(51) Int. Cl.$^7$ ........................... B01D 19/00; B01D 45/16
(52) U.S. Cl. ........................... 96/168; 55/459.1; 96/171; 96/209; 96/216; 96/406
(58) Field of Search ........................... 96/406, 168, 171, 96/209, 216; 55/459.1; 210/512.1

(56) References Cited

U.S. PATENT DOCUMENTS 2,153,026 A * 4/1939 Ringius ........................ 55/459.1
4,564,374 A * 1/1986 Hofmann ........................ 95/24
4,622,051 A * 11/1986 Polach et al. .................. 55/417
5,332,501 A * 7/1994 Mangialardi ............. 210/512.3

FOREIGN PATENT DOCUMENTS

JP 08187403 7/1996
JP 1048392 2/1998
JP 11347306 12/1999

* cited by examiner

Primary Examiner—Richard L. Chiesa
(74) Attorney, Agent, or Firm—Dennison, Schultz, Dougherty & MacDonald

(57) ABSTRACT

Gas/liquid separating devices include a separator (1) for separating a mixed gas/liquid flow (M). A liquid drain (2) communicates with the separator and defines a liquid storage chamber (30). The liquid drain serves to temporarily store a liquid separated from the mixed flow within the liquid storage chamber, so that a space that is not occupied by the liquid is ensured within the liquid storage chamber. An adjusting mechanism (52, 152) may serve to adjust the pressure within the space of the liquid storage chamber.

15 Claims, 3 Drawing Sheets

US 6,776,823 B2

GAS/LIQUID SEPARATING DEVICES

This application claims priority to Japanese patent application serial number 2002-032816, the contents of which are incorporated herein by reference.

TECHNICAL FIELD

The present invention relates to gas/liquid separating devices that include a gas/liquid separator and a liquid drain. More preferably, the present invention relates to gas/liquid separating devices that include a bypass path for reducing pressure within the liquid drain.

DESCRIPTION OF THE RELATED ART

A vertical cross sectional view of a known gas/liquid separating device is shown in FIG. 3. The gas/liquid separating device includes a gas/liquid separator 101 and a liquid drain 102. The gas/liquid separator 101 includes a substantially cylindrical cyclone generator 110, in which a cyclone chamber 112 is defined. A gas/liquid inlet port 113 is formed on an upper lateral side of the cyclone generator 110 and is oriented in a substantially tangential direction of the cyclone generator 110. A liquid outlet port 114 is formed on the bottom of the cyclone generator 110 and extends downward therefrom. A gas channel 118 extends from the top of the cyclone generator 110 and extends upward therefrom.

A mixed gas/liquid flow M that will be separated by the gas/liquid separator 101 may be supplied into the cyclone chamber 112 via the inlet port 113 under relatively high pressure in the tangential direction of the cyclone generator 110. The mixed gas/liquid flow M may contain a gas (e.g., hydrogen gas) and relatively small liquid particles (e.g., water particles). The mixed flow M may circulate or swirl, so that the mixed flow M may be separated into the liquid and the gas due to centrifugal force. The separated liquid may flow downwardly into a float chamber 130 defined within the liquid drain 102 via the liquid outlet port 114 of the cyclone generator 110 and then may be discharged to the outside. On the other hand, the separated gas may be discharged from the cyclone generator 110 into the gas discharge channel 118.

The liquid drain 102 includes a drain body 120, a valve seat 134, a float valve 136 and a float 140. The float chamber 130 is defined within the drain body 120. A liquid inlet port 131 is formed on the drain body 120. One end of the liquid inlet port 131 opens within the upper space of the float chamber 130 and the other end of the liquid inlet port 131 communicates with the liquid outlet port 114 of the separator 101. Therefore, the separated liquid may flow downward from the liquid outlet port 114 through the liquid inlet port 131 and then may be stored in the float chamber 130.

The valve seat 134 defines a drain hole 135 and the liquid stored in the float chamber 130 can be discharged through the drain hole 135. In addition, a liquid discharge channel 133 extends from the drain body 120. One end of the liquid discharge channel 133 communicates with the drain hole 135 and the other end of the discharge liquid channel 133 communicates with the atmosphere. A check valve 132 is disposed within the discharge liquid channel 133 in order to prevent liquid counter flow. The float valve 136 may be designed as a needle valve and may be vertically movably disposed within the valve sheet 134. The float valve 136 may open and close the drain hole 135 as the float valve 36 respectively moves upward and downward.

A float 140 may include a float lever 141 that can move together with a float body 142. The float 140 may float on the surface of the liquid stored within the float chamber 130. The float lever 141 is pivotally mounted on an inner wall of the drain body 120 by means of a pin 145, so that the float body 142 can vertically pivot about the pin 145. The float lever 141 is coupled to the float valve 136, so the float valve 136 will move vertically as the float lever 141 pivots.

When the level of the liquid stored in the float chamber 130 becomes higher than a predetermined level, the. float body 142 moves upward. Then, the float valve 136 moves upward in response to the movement of the float lever 141, so that the float valve 136 opens the drain hole 135. Therefore, the liquid within the float chamber 130 is discharged to the outside through the liquid discharge channel 133 via the drain hole 135, so that the water level is lowered. As the liquid level in the float chamber 130 is lowered, the float body 142 moves downward. Then, the float valve 136 moves downward in response to the movement of the float lever 141. When the water level reaches the predetermined level, the float valve 136 closes the drain hole 135. Therefore, further discharge of the liquid within the float chamber 130 is stopped.

As a result, the liquid drain 102 serves to discharge the liquid within the float chamber 130 when the liquid level exceeds the predetermined level, so that the amount of water within the float chamber 130 may be maintained at a predetermined amount.

SUMMARY OF THE INVENTION

However, when the gas and liquid are separated using this known gas/liquid separating device, a possibility exists that liquid particles may be entrained by the gas that flows from the cyclone chamber 112 of the separator 101 into the gas discharge channel 118. As a result, the liquid particles may be carried into the gas discharge channel 118. For example, this phenomenon may occur when the float valve 136 of the liquid drain 102 closes the drain hole 135, and when (1) a relatively large amount of liquid flows from the upstream side to block the liquid inlet port 131 and to thereby prevent the liquid from easily flowing into the float chamber 130 via the liquid inlet port 131 or (2) the mixed gas/liquid flow M is circulating within the cyclone 112 at a relatively high speed.

When the float valve 136 of the liquid drain 102 opens the drain hole 135, the liquid and the gas within the cyclone chamber 112 may smoothly flow into the float chamber 130. Therefore, in this occasion, there is a reduced possibility that water will be carried into the gas discharge channel 118. However, if the float valve 136 is closed, the space within the float chamber 130 may be blocked in a manner like a blind alley. Therefore, the gas within the float chamber 130 may not be easily exchanged with the liquid that may fall into the float chamber 130 from the upper side of the float chamber 130. As a result, the liquid within the cyclone chamber 112 may stagnate within the liquid outlet port 114. When this stagnation occurs, the liquid will likely be entrained by the gas that flows into the gas discharge channel 118.

Therefore, the known gas/liquid separating device has a problem that the liquid particles may enter into the gas discharge channel 118 due to entrainment by the gas that flows from the cyclone chamber 112 of the gas/liquid separator 101 into the gas discharge channel 118. As a result, liquid can not be effectively separated from the gas. In addition, when the liquid enters the gas discharge channel 118, the liquid may be unfavorably retained in the gas discharge channel 118.

It is, accordingly, one object of the present invention to teach improved techniques for preventing or substantially minimizing liquid from being carried into a gas discharge channel.

According to one aspect of the present teachings, gas/liquid separating devices are taught that may include a separator for separating a mixed gas/liquid flow, e.g. a mixed flow of hydrogen gas and water. A liquid drain may be coupled to the separator and may define a liquid storage chamber. In this case, liquid separated by the separator may flow into the liquid storage chamber, e.g., due to gravity. The liquid may be temporarily stored within the liquid storage chamber and may be discharged from the liquid drain at an appropriate time before the liquid fully occupies or completely fills the liquid storage chamber. Therefore, a space that is not occupied by the liquid is ensured within the liquid storage chamber. An adjusting device may be utilized to adjust the pressure within the space of the liquid storage chamber. For example, the adjusting device may adjust the pressure so that the separated liquid can easily flow into the liquid storage chamber.

Therefore, the separated liquid may be prevented, or substantially prevented, from being entrained by the separated gas that is discharged from the separator. As a result, the liquid separation efficiency of the separator may be improved.

According to another aspect of the present teachings, the adjusting device may enable gas that has entered into the liquid storage chamber to be communicated, e.g., to a gas discharge port or gas discharge channel, thereby reducing the pressure within the liquid storage chamber. As a result, the separated liquid may easily enter the liquid storage chamber without being blocked or prevented from entering the liquid storage chamber by relatively high pressure within the liquid storage chamber.

According to another aspect of the present teachings, the adjusting device may include a pipe that is connected between the space of the liquid storage chamber and a source of negative or reduced pressure. For example, the source of negative or reduced pressure may include a gas discharge channel that communicates with the separator in order to discharge the separated gas to the outside. Therefore, the flow of the separated gas may be used to generate a negative or reduced pressure within the pipe. Thus, manufacturing costs may be minimized because no additional device is required to be dedicated to generate the negative or reduced pressure.

According to another aspect of the present teachings, the pipe may connect the space of the liquid storage chamber to the gas discharge channel and may bypass a gas/liquid separation chamber defined within the separator. According to another aspect of the present teachings, a first end of the pipe may open into the gas discharge channel within an angular range of about 0 degree to 90 degrees relative to the direction of flow of the separated gas within the gas discharge channel. By utilizing this arrangement, negative or reduced pressure can be effectively generated. For example, the first end of the pipe may open into the gas discharge chamber substantially perpendicular to the direction of flow of the separated gas within the gas discharge channel. This arrangement may be suitably incorporated in combination with the arrangement in which the pipe is disposed outside of the separator.

In the alternative, the first end of the pipe may open into the gas discharge chamber in substantially the same direction as the direction of flow of the separated gas within the gas discharge channel. This arrangement may be suitably incorporated in combination with the arrangement in which the pipe is disposed within the separator, e.g., through the separation chamber of the separator and the liquid storage chamber of the liquid drain. According to this arrangement, the pipe will not be exposed to the outside of the gas/liquid separating device. Therefore, the gas/liquid separating device may have a relatively compact construction.

In another aspect of the present teachings, an orifice may be disposed adjacent to and upstream of a converging point of the pipe to the gas discharge channel. As the separated gas flows through the orifice, the flow rate (speed) of the gas may be increased in order to increase the negative or reduced pressure at the converging point of the pipe. Therefore, the gas within the liquid storage chamber may be rapidly and reliably discharged into the gas discharge channel via the pipe. As a result, separation efficiency may be further improved. For example, the orifice may include a constriction opening that has a smaller cross section than the cross section of the gas discharge channel.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

Figure 1:
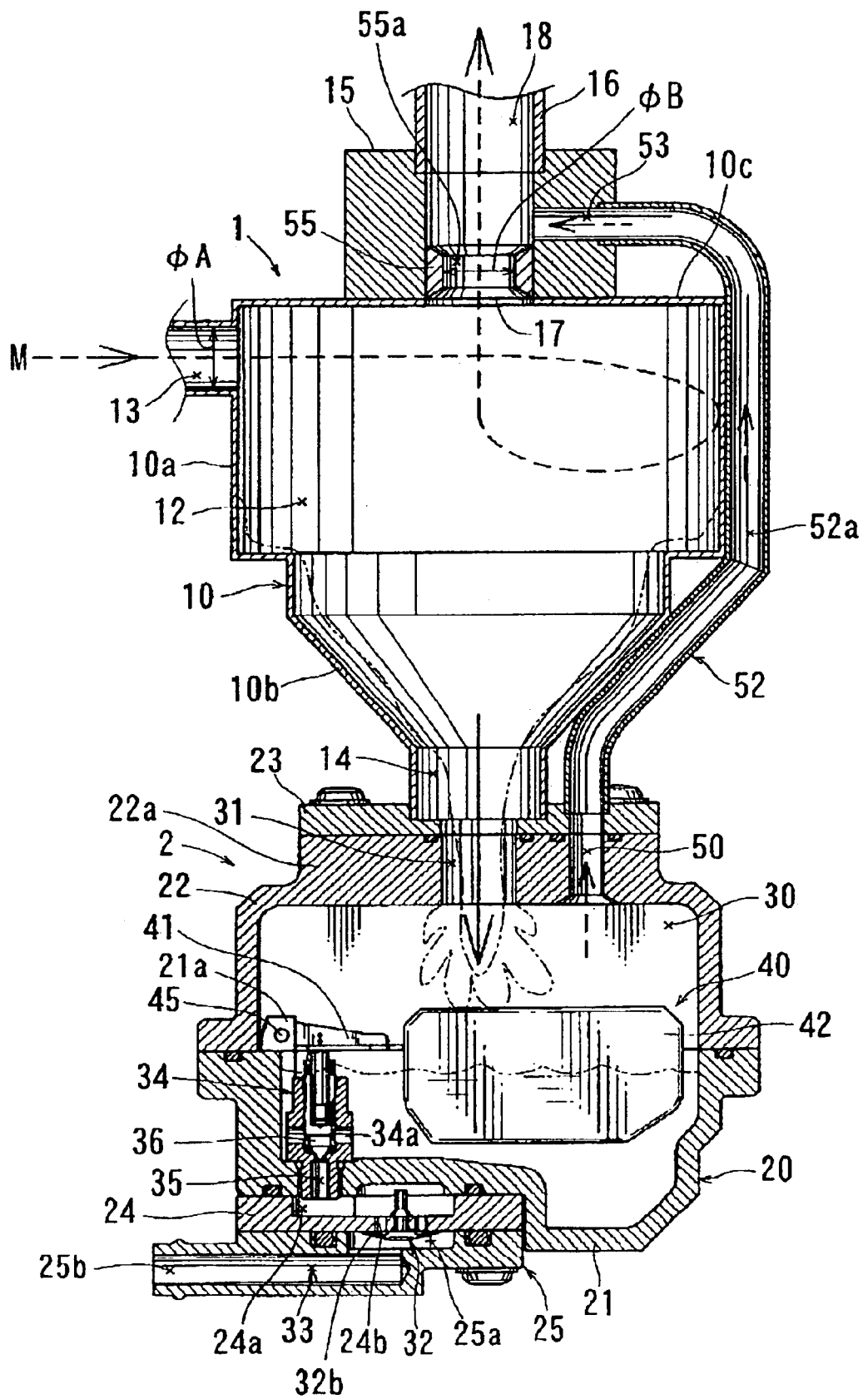
FIG. 1 is a vertical, cross-sectional view of a first representative gas/liquid separating device.

In one embodiment of the present teachings, gas/liquid separating devices may include a separator and a liquid drain. The separator may define a separation chamber and may be operable to separate a mixed gas/liquid flow (e.g. hydrogen gas and water) into a gas and a liquid. For example, the separator may include a cyclone generating device that can separate the mixed flow by using centrifugal force. The liquid drain may define a liquid storage chamber and may serve to store the separated liquid within the liquid storage chamber. Surplus liquid may be discharged from the liquid drain when the amount of the liquid stored within the liquid storage chamber exceeds a predetermined amount. A gas discharge channel may serve to discharge the separated gas from the separator. A bypass channel may be arranged to bypass the separation chamber so as to extend between an upper space of the liquid storage chamber and the gas discharge channel. The gas within the liquid storage chamber may be communicated to the gas discharge channel via an adjusting device that may generate a negative or reduced pressure within the bypass pipe. For example, the adjusting device may utilize the flow of the gas within the gas discharge channel in order to generate the negative or reduced pressure.

Therefore, any gas that has entered the upper space of the liquid storage chamber will not remain in the upper space. Instead, the gas will be communicated to the gas discharge channel, irrespective of whether separated liquid is being stored within the liquid storage chamber or the separated liquid is being discharged from the liquid storage chamber. As a result, the phenomenon of entrainment of the separated liquid within the separation chamber by the flow of the separated gas into the gas discharge channel may be minimized or prevented, thereby improving separation efficiency.

In another embodiment of the present teachings, an orifice may be disposed within the gas discharge channel. The orifice may define a flow opening that has a cross sectional area smaller than the cross sectional area of the gas discharge channel. The orifice may be disposed adjacent to and on the upstream side of a converging point of the bypass channel. According to this embodiment, the flow rate (speed) of the gas on the downstream side of the orifice may become higher than the flow rate (speed) on the upstream side, thereby generating increased negative pressure within the bypass pipe. Therefore, any gas that enters the liquid storage chamber will be removed more rapidly from the liquid storage chamber. As a result, separation efficiency may be further improved.

In another embodiment of the present teachings, the bypass channel may include a bypass pipe that may extend outside (i.e., may be disposed outside) of the gas/liquid separating device or may extend through (i.e., may be disposed within) the separation chamber of the separator. The latter arrangement is advantageous because the bypass pipe will not be exposed to the outside environment, and the gas/liquid separating device may have a relatively compact construction.

In another embodiment of the present teachings, a float may be disposed within the liquid storage chamber. A float valve may be coupled to the float. A discharge channel may communicate with the liquid storage chamber via the float valve. The float moves up and down (vertically) in response to the level of the liquid stored in the liquid storage chamber. The valve may operate in response to the movement of the float so as to permit the liquid stored in the liquid storage chamber to be discharged into the discharge channel when the amount of the liquid within the liquid storage chamber exceeds a predetermined amount.

Each of the additional features and teachings disclosed above and below may be utilized separately or in conjunction with other features and teachings to provide improved gas/liquid separating devices and methods for designing and using such gas/liquid separating devices. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative embodiment of the present invention will now be described with reference to FIG. 1. FIG. 1 shows a vertical, cross-sectional view of a first representative gas/liquid separating device that includes a gas/liquid separator 1 and a liquid drain 2. The representative gas/liquid separating device may be disposed on or within a vehicle, e.g., an automobile, and may be coupled to a device, e.g., a fuel cell, that oxidizes hydrogen gas and exhausts water.

The gas/liquid separator 1 may be configured as a cyclone-type separator and may include a cyclone generating device 10 as a primary element. The cyclone generating device 10 may include a substantially cylindrical portion 10a, a funnel-shaped portion 10b and an upper plate portion 10c. The funnel-shaped portion 10b may be continuously and integrally formed with the cylindrical portion 10a and may extend downward from the cylindrical portion 10a. The funnel-shaped portion 10b may be configured as an inverted hollow cone. The cylindrical portion 10a and the funnel-shaped portion 10b may define a cyclone chamber 12 that may serve as a gas/liquid separation chamber.

A gas/liquid mixture inlet port 13 may have a substantially cylindrical configuration and may be defined on an upper, lateral side of the cylindrical portion 10a. The inlet port 13 may be oriented substantially in a tangential direction relative to the cylindrical portion 10a.

A mixed gas/liquid flow M may contain a gas (e.g., hydrogen gas) and a liquid (e.g., water), which mixture is generated upstream of the mixture inlet port 13. The mixed flow M may be supplied into the cyclone chamber 12 via the inlet port 13 at a predetermined pressure that is regulated by a pressure regulator (not shown).

The lower end of the funnel-shaped portion 10b of the cyclone generating device 10 may be defined as a liquid outlet port 14 and the liquid may flow downward through the liquid outlet port 14. A substantially vertically extending axis is defined within the liquid outlet port 14, which axis is preferably aligned with the substantially vertically extending axis of the cylindrical portion 10a. The liquid outlet port 14 may communicate with a float chamber 30 that is defined within the liquid drain 2.

A substantially circular gas discharge hole 17 may be defined in the center of the upper plate portion 10c of the cyclone generating device 10. A substantially cylindrical pipe joint 15 may be coupled to the upper plate portion 10c and may communicate with the gas discharge hole 17. A gas discharge pipe 16 may be connected to the pipe joint 15. In this case, the gas discharge hole 17, the pipe joint 15 and the gas discharge pipe 16 will cooperate to define a gas discharge channel 18. The gas discharge channel 18 may communicate with an upstream side of a gas supply channel (not shown) for supplying the gas (hydrogen gas). A suction pump (not shown) may be disposed on the downstream side of the gas discharge channel 18, so that the gas within the gas discharge channel 18 may be drawn by the suction pump and then may be returned to the gas supply channel.

The liquid drain 2 may include, e.g., a drain body 20, a valve scat 34, a float valve 36 and a float 40.

The drain body 20 may include a reservoir 21 having an upper opening. A lid 22 may close the upper opening of the reservoir 21. A joint plate 23 may be disposed on the upper surface of the lid 22. Further, a spacer 24 may be disposed below the lower surface of the reservoir 21 and an end plate 25 may be disposed below the lower surface of the spacer 24. The lid 22, the joint plate 23, the spacer 24 and the end plate 25 may be coupled to the reservoir 21 by a suitable fastening (tightening) mechanism, such as a bolt and a nut.

Figure 2:
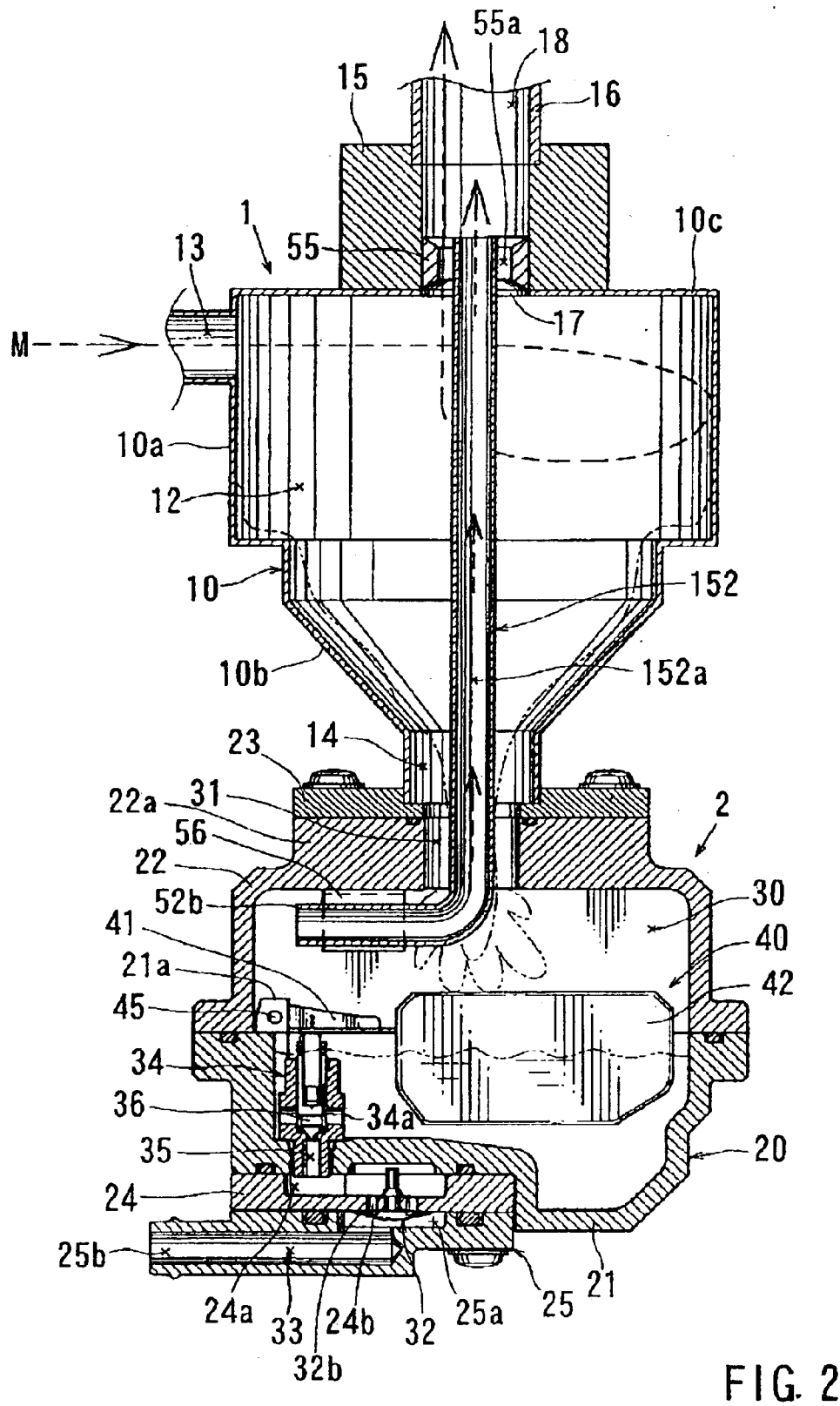
FIG. 2 is a vertical, cross-sectional view of a second representative gas/liquid separating device.
Figure 3:
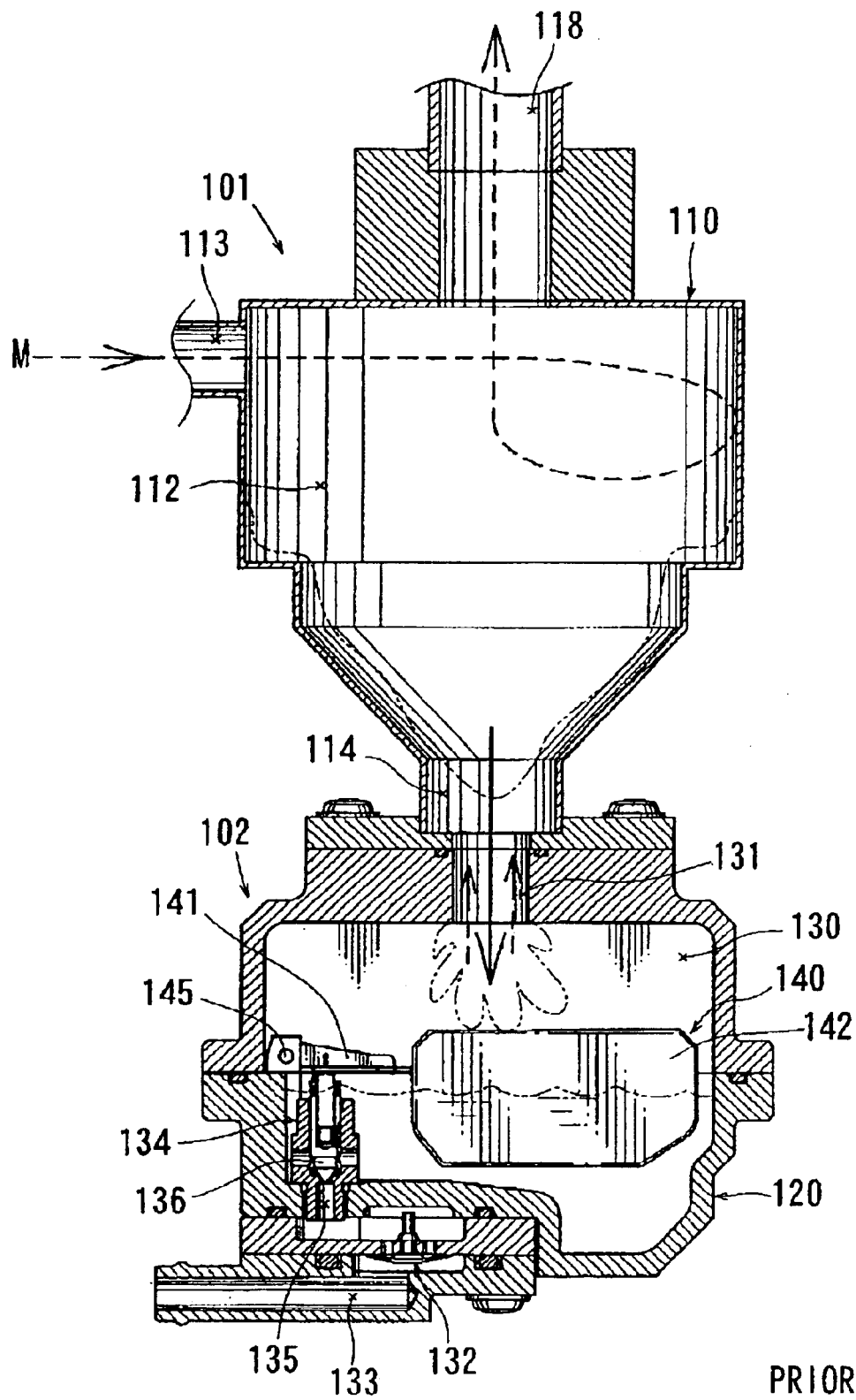
FIG. 3 is a vertical, cross-sectional view of a known gas/liquid separating device.

Sealing rings preferably may be disposed at the respective joining (or contacting) surfaces between the lid 22 and the reservoir 21, between the joint plate 23 and the lid 22, between the spacer 24 and the reservoir 21, and between the spacer 24 and the end plate 25. The respective sealing rings are shown in FIGS. 1 and 2, but are not numbered.

The float chamber 30 may be defined between the reservoir 21 and the lid 22 and may serve as a liquid storage chamber that stores the liquid, e.g., water. A pin support portion 21a may extend from the reservoir 21 at a position adjacent to the joining or contacting surface between the reservoir 21 and the lid 22 and may extend into the lid 22.

A liquid inlet port 31 may be defined so as to extend through an upper plate portion 22a of the lid 22 and the joint plate 23 and may open at the top of the float chamber 30. The liquid outlet port 14 of the separator 1 preferably communicates with the liquid inlet port 31. Therefore, the liquid that has been separated by the separator 1 may flow downward through the liquid inlet port 31 via the liquid outlet port 14 and then may be stored within the float chamber 30.

A recess 24a may be defined in an upper surface of the spacer 24. A communication hole 24b may be defined within the spacer 24 and may extend downward from the bottom of the recess 24a and may open at the lower surface of the spacer 24. A check valve 32 may be made of resilient, elastic material, e.g., rubber, and may be frictionally fitted or pressure fitted onto the spacer 24 by utilizing the resiliency of the check valve 32. Thus, the check valve 32 can open and close the lower end of the communication hole 24b.

Therefore, the check valve 32 may resiliently deform to open the communication hole 24b when the pressure within the recess 24a exceeds a predetermined pressure. On the other hand, the check valve 32 preferably recovers its original configuration so as to close the communication hole 24b, when the pressure within the recess 24a becomes less than the predetermined pressure. In addition, the check valve 32 may prevent liquid counter flow when the pressure within the recess 24a becomes less than the pressure of the downstream side of the check valve 32. In this way, the check valve 32 may serve as a dual safety valve.

A recess 25a may be defined in an upper surface of the end plate 25 and may surround a valve head 32a of the check valve 32. Thus, when the check valve 32 opens, the recess 25a may communicate with the communication hole 24b. A liquid drain port 25b may be formed in the end plate 25. A first end of the liquid drain port 25b may communicate with the recess 25a and a second end of the liquid drain port 25b may open to the environment or to outside of the liquid drain 2. Therefore, the recess 24a of the spacer 24, the communication hole 24b and the recess 25a and the discharge port 25b may together define a liquid discharge channel 33.

The valve seat 34 may have a substantially tubular configuration and may include a seat surface defined within a lower portion of the valve seat 34. A suitable number of openings 34a (two openings 34a are shown in FIG. 1) may be defined within the valve seat 34 in a position adjacent to and above the seat surface. The openings 34a enable the inner space of the valve seat 34 to communicate with the outside of the valve seat 34. Therefore, a liquid discharge port 35 may be defined by the space within the valve seat 34 and the openings 34a.

The lower end of the valve seat 34 may threadably engage a corresponding threaded hole defined in the bottom of the reservoir 21. In this case, the valve seat 34 will be supported so as to extend substantially vertically within the float chamber 30. The liquid discharge port 35 may communicate with the space within the float chamber 30 and with the recess 24a of the spacer 24. Therefore, liquid stored in the float chamber 30 may be discharged into the discharge channel 33 via the liquid discharge port 35.

The float valve 36 may be configured, e.g., as a needle valve, and may be disposed within the valve seat 34 such that the float valve 36 can move vertically relative to the valve seat 34. The float valve 36 may close the liquid discharge port 35 when the float valve 36 is seated against the valve seat surface of the valve seat 34 as shown in FIG. 1. On the other hand, the float valve 36 may open the liquid discharge port 35 when the float valve 36 moves away (separates) from the valve seat surface.

The float 40 may include a float lever 41 affixed to a float body 42. The float body 42 preferably may be designed to float on the surface of the liquid stored within the float chamber 30. For example, the float body 42 may have a substantially parallelepiped configuration and may be made of an expanded foam rubber element that comprises a plurality of individually-formed foam pieces.

The float lever 41 may be positioned so as to extend from a portion (e.g., the left side portion as viewed in FIG. 1) of the float body 42 into the float chamber 30. One end of the float lever 41 may be connected to a pin support portion 21a of the float body 20 via a pin 45, so that the float body 42 can vertically pivot relative to the float body 20 about the pin 45. The upper portion of the float valve 36 may be coupled to the float lever 41, so that the float valve 36 can move vertically as the float body 42 pivots.

A gas exhaust port 50 may be defined so as to extend through the upper plate portion 22a and the joint plate 23 of the liquid drain 2 and may open at the top of the float chamber 30. Thus, the gas exhaust port 50 may communicate with the upper space of the float chamber 30, i.e., the portion of the float chamber 30 that the separated gas enters. A gas converging port 53 may be defined within the pipe joint 15 of the separator 1 and may connect the inside and outside of the gas discharge channel 18.

A first end of a bypass pipe 52 may be connected to the gas exhaust port 50 and a second end of the bypass pipe 52 may be connected to the gas converging port 53. The inner space of the bypass pipe 52 may define a bypass channel 52a that enables the gas exhaust port 50 to directly communicate with the gas converging port 53 in order to bypass the cyclone chamber 12. The bypass pipe 52 may be configured to extend along the outer surface of the cyclone generating device 10.

A ring-shaped orifice 55 may be disposed within the pipe joint 15 of the separator 1. The orifice 55 may be disposed, e.g., between the gas converging port 53 and the opening of the gas discharge hole 17. Further, the orifice 55 may define a constriction opening 55a that has a substantially circular cross section and that has a diameter smaller than the inner diameter of the gas discharge channel 18. The mixture inlet port 13 has an inner diameter of $\phi$ A and the constriction opening 55a has an inner diameter of $\phi$ B. $\phi$ A is preferably greater than $\phi$ B.

During operation of the first representative gas/liquid separating device, the mixed gas/liquid flow M may be supplied into the cyclone generating device 10 of the gas/liquid separator 1 via the mixture inlet port 13 under relatively high pressure. Further, the pressure of the mixed flow M may be adjusted to a predetermined pressure by the pressure regulator.

The mixed flow M may be fed into the cyclone chamber 12 in the tangential direction of the cyclone generating device 10 via the mixture inlet port 13. In this case, the mixed flow M will circulate and swirl along the inner wall of the cyclone chamber 12. As a result, the mixed flow M can be separated into a liquid and a gas due to centrifugal force. Then, the liquid separated within the cyclone chamber 12 may flow downward from the cyclone chamber 12 into the float chamber 30 via the liquid outlet port 14 and the liquid inlet port 31 of the liquid drain 2 and then may be temporarily stored within the float chamber 30.

On the other hand, the gas separated within the cyclone chamber 12 may be drawn into the gas discharge channel 18 by the suction pump and then may be returned to the gas supply channel (not shown).

As the level of the liquid that is stored within the float chamber 30 of the liquid drain 2 increases, the float body 42 may rise due to its buoyancy. In this case, the float lever 41 will pivot upwardly. Therefore, the float valve 36 may move upward to open the liquid discharge port 35 and thereby allow the liquid within the float chamber 30 to flow into the discharge liquid channel 33 via the liquid discharge port 35.

If the mixed flow M is supplied into the cyclone chamber 12 of the separator 1 under elevated pressure, the space within the float chamber 30 that communicates with the cyclone chamber 12 also will be under elevated pressure. Therefore, when the float valve 36 opens, the pressure within the float chamber 30 urges the check valve 32 within the liquid discharge channel 33 to open. As a result, the liquid within the liquid discharge channel 33 may be discharged to the outside via the liquid drain port 25b.

As the liquid is discharged through the drain port 25b, the liquid level within the float chamber 30 will be lowered and the float body 42 of the float 40 may move downward due to gravity. Then, the float lever 41 pivots downward, so that the float valve 36 moves downward to close the liquid discharge port 35. Consequently, the liquid within the float chamber 30 may be prevented from being discharged and the check valve 32 within the liquid discharge channel 33 may be closed.

Thus, when the volume of the liquid stored within the float chamber 30 exceeds a predetermined volume, the liquid drain 2 may discharge the portion of the stored liquid that exceeds the predetermined amount. As a result, the amount of the liquid within the float chamber 30 may be maintained at the predetermined amount.

In addition, in this first representative embodiment, the gas stored within the upper part of the float chamber 30 may flow into the gas discharge channel 18 via the bypass channel 52a due to the flow of the gas within the gas discharge channel 18. For example, due to a pressure difference between the upper portion of the float chamber 30 and the gas discharge channel 18, two gas flow paths may be respectively defined between the cyclone chamber 12 and the gas discharge channel 18. A first gas flow path allows the gas to directly flow from the cyclone chamber 12 to the gas discharge channel 18. A second gas flow path allows the gas to flow from the cyclone chamber 12 to the gas discharge channel 18 via the upper space of the float chamber 30 of the liquid drain 2, and the bypass channel 52a.

Therefore, gas stagnation within the upper space of the float chamber 30 may be substantially minimized or prevented, irrespective of whether the liquid is being stored within the liquid drain 2 (e.g., when the float valve 36 is closed) or the liquid is being discharged (e.g., when the float valve 36 is opened). Consequently, the phenomenon of liquid entrainment in the flow of gas from the separator 1 to the gas discharge channel 18 may be minimized or prevented, thereby improving the liquid separation efficiency.

Furthermore, if the orifice 55 that defines the constriction opening 55a is disposed within the gas discharge channel 18, the gas flow rate may increase toward the downstream side of the orifice 55 or the converging point of the bypass channel 52a. In this case, negative or reduced pressure may be applied to the bypass channel 52a via the gas discharge channel 18. Therefore, the gas disposed within the upper space of the float chamber 30 in the liquid drain 2 may be rapidly discharged via the bypass channel 52a and the gas discharge channel 18. As a result, liquid separation efficiency may be further improved.

A second representative gas/liquid separating device will now be described with reference to FIG. 2, which shows a vertical, cross-sectional view of the second representative gas/liquid separating device. The second representative gas/liquid separating device only differs from the first representative gas/liquid separating device in the arrangement of the bypass pipe 52 (152). In other respects, the second representative gas/liquid separating device may utilize the same construction as the first representative gas/liquid separating device. Therefore, description will only be given to the arrangement of the bypass pipe 152 and further explanation of identical constructions can be omitted.

As noted above, the second representative gas/liquid separating device also may include a bypass pipe 152 that defines a bypass channel 152a. The bypass pipe 152 may extend in an axial direction (vertical direction as viewed in FIG. 2) within the cyclone chamber 12 of the gas/liquid separator 1. For example, the lower portion of the bypass pipe 152 may be loosely inserted through the liquid discharge port 14 of the cyclone chamber 12 of the separator 1 and through the liquid inlet port 31 of the liquid drain 2. A lower end 52b of the bypass pipe 152 may be bent in a substantially L-shape form within the upper space of the float chamber 30. The lower end 52b may be supported by the lid 22 via a bracket 56, so that the entire bypass pipe 152 is supported in a cantilever manner by the bracket 56 or the liquid drain 2.

The upper portion of the bypass pipe 152 may be loosely inserted through the gas outlet hole 17 and through the constriction opening 55a of the orifice 55. The upper end of the bypass pipe 152 opens at a level that is substantially flush with the level of the upper opening of the orifice 55. Therefore, the bypass channel 152a converges with the gas discharge channel 18 around the upper opening of the orifice 55.

If the bypass pipe 152 extends through the cyclone chamber 12 of the separator 1, the second representative gas/liquid separating device may have a relatively compact construction in comparison with the first representative gas/liquid separating device, in which the bypass pipe 52 is disposed on the outside of the cyclone chamber 12. Further, the air exhaust port 50 of the liquid drain 2 as well as the gas converging port 53 of the pipe joint 15 are not required in the second representative embodiment.

Furthermore, the second representative gas/liquid separating device may be modified so as not to include the orifice 55. Because the upper end of the bypass pipe 152 extends into the pipe joint 15, the pipe joint 15 naturally has a reduced flow area at this position.

The first and second representative gas/liquid separating devices may be advantageously utilized in vehicles that are equipped with devices, e.g. fuel cells, that oxidize hydrogen gas in order to generate power for the vehicle.

Further, the present teachings are not limited to the above-described embodiments and may be modified in various ways. For example, the gas/liquid separator 1 is not required to include the cyclone generating device 10 as in the above representative embodiments. Instead, a variety of different separation mechanisms may be utilized, such as a separation mechanism in which the mixed flow M impinges on a vertical wall in order to separate the gas from the liquid.

What is claimed is:

1. A gas/liquid separating device comprising:

a separation chamber arranged and constructed to separate a mixed gas/liquid flow into a gas and a liquid, a liquid drain defining a liquid storage chamber that is arranged and constructed to store the separated liquid, the liquid drain further including means for discharging surplus liquid into the liquid drain when the amount of the liquid stored within the liquid storage chamber exceeds a predetermined amount, a gas discharge channel arranged and constructed to discharge the separated gas from the separation chamber, a bypass channel arranged and constructed to bypass the separation chamber, the bypass channel extending between an upper space of the liquid storage chamber and the gas discharge channel, wherein the bypass channel is further arranged and constructed to lead the gas within the liquid storage chamber into the gas discharge channel by utilizing the flow of the gas within the gas discharge channel, and an orifice disposed within the gas discharge channel and defining a flow opening that has a cross sectional area smaller than the cross sectional area of the gas discharge channel, the orifice being disposed adjacent to and upstream of a converging point of the bypass channel.

2. A gas/liquid separating device as in claim 1, further comprising a bypass pipe defining the bypass channel, the bypass pipe being disposed within the separation chamber.

3. An apparatus comprising:

a separation chamber arranged and constructed to separate a mixed gas/liquid flow, a liquid drain in communication with the separation chamber, the liquid drain defining a liquid storage chamber, wherein the liquid drain is arranged and constructed to temporarily store liquid separated from the mixed gas/liquid flow within the liquid storage chamber while leaving a space within the liquid storage chamber that is not occupied by the stored liquid, means for adjusting the pressure within the space of the liquid storage chamber, wherein the adjusting means provides a gas flow path for separated gas that has entered into the liquid storage chamber, the adjusting means comprises a pipe that enables the space within the liquid storage chamber to communicate with a source of negative or reduced pressure, and the source of negative or reduced pressure comprises a gas discharge channel connected to the separation chamber in order to discharge the gas separated within the separation chamber to the outside, and an orifice disposed adjacent to and upstream of a connecting point of the pipe to the gas discharge channel.

4. An apparatus as in claim 3, wherein the pipe connects the space of the liquid storage chamber to the gas discharge channel and bypasses the separation chamber.

5. An apparatus as in claim 4, wherein a first end of the pipe opens into the gas discharge channel within an angular range of about 0 degree to 90 degrees relative to the direction of flow of the separated gas within the gas discharge channel.

6. An apparatus as in claim 5, wherein the first end of the pipe opens into the gas discharge chamber substantially perpendicular to the direction of flow of the separated gas within the gas discharge channel.

7. An apparatus as in claim 6, wherein the pipe is disposed outside of the separation chamber.

8. An apparatus as in claim 5, wherein the first end of the pipe opens into the gas discharge chamber in substantially the same direction as the direction of flow of the separated gas within the gas discharge channel.

9. An apparatus as in claim 8, wherein the pipe is disposed within the separation chamber.

10. An apparatus as in claim 3, wherein a constriction opening is defined within the orifice and the constriction opening has a smaller cross section than the cross section of the gas discharge channel.

11. An apparatus as in claim 10, wherein the separation chamber is arranged and constructed to separate the liquid from the gas by centrifugal force.

12. An apparatus as in claim 11, further including a float disposed within the liquid storage chamber, a float valve coupled to the float, and a discharge channel communicating with the liquid storage chamber via the float valve, wherein the float is arranged and constructed to move vertically in response to the liquid level stored within the liquid storage chamber, the valve is arranged and constructed to operate in response to movement of the float so as to permit the liquid stored in the liquid storage chamber to be discharged into the discharge channel when the amount of the liquid within the liquid storage chamber exceeds a predetermined amount.

13. An apparatus as in claim 3, wherein the separation chamber is arranged and constructed to separate the liquid from the gas by centrifugal force.

14. An apparatus as in claim 3, further including a float disposed within the liquid storage chamber, a float valve coupled to the float, and a discharge channel communicating with the liquid storage chamber via the float valve, wherein the float is arranged and constructed to move vertically in response to the liquid level stored within the liquid storage chamber, the valve is arranged and constructed to operate in response to movement of the float so as to permit the liquid stored in the liquid storage chamber to be discharged into the discharge channel when the amount of the liquid within the liquid storage chamber exceeds a predetermined amount.

15. An apparatus comprising:

a separation chamber arranged and constructed to separate a mixed gas/liquid flow, a liquid drain in communication with the separation chamber, the liquid drain defining a liquid storage chamber, wherein the liquid drain is arranged and constructed to temporarily store liquid separated from the mixed gas/liquid flow within the liquid storage chamber while leaving a space within the liquid storage chamber that is not occupied by the stored liquid, means for adjusting the pressure within the space of the liquid storage chamber, wherein the adjusting means provides a gas flow path for separated gas that has entered into the liquid storage chamber, and comprises a pipe that enables the space within the liquid storage chamber to communicate with a source of negative or reduced pressure, the source of negative or reduced pressure comprises a gas discharge channel connected to the separation chamber in order to discharge the gas separated within the separation chamber to the outside, the pipe connects the space of the liquid storage chamber to the gas discharge channel and bypasses the separation chamber, a first end of the pipe opens into the gas discharge channel within an angular range of about 0 degree to 90 degrees relative to the direction of flow of the separated gas within the gas discharge channel, the first end of the pipe opens into the gas discharge chamber in substantially the same direction as the direction of flow of the separated gas within the gas discharge channel, and the pipe is disposed within the separation chamber, and an orifice disposed adjacent to and upstream of a connecting point of the pipe to the gas discharge channel.

* * * * *